(12) United States Patent
Xu et al.

(10) Patent No.: US 10,914,359 B2
(45) Date of Patent: Feb. 9, 2021

(54) FIXTURE FOR STICKING BALANCE BLOCKS TO SURFACE OF HUB

(71) Applicant: CITIC Dicastal CO., LTD., Hebei (CN)

(72) Inventors: Zuo Xu, Qinhuangdao (CN); Liqun Zheng, Qinhuangdao (CN); Jiwei Zhou, Qinhuangdao (CN)

(73) Assignee: CITIC Dicastal CO., LTD., Qinhuangdao (CN)

( * ) Notice: Subject to any disclaimer, the term of this patent is extended or adjusted under 35 U.S.C. 154(b) by 189 days.

(21) Appl. No.: 16/257,255

(22) Filed: Jan. 25, 2019

(65) Prior Publication Data

US 2019/0360553 A1 Nov. 28, 2019

(30) Foreign Application Priority Data

May 24, 2018 (CN) .......................... 2018 1 0505284

(51) Int. Cl.
  *B25B 11/02* (2006.01)
  *B60B 21/02* (2006.01)
  *B25B 27/00* (2006.01)
  *F16F 15/32* (2006.01)

(52) U.S. Cl.
  CPC ............ *F16F 15/324* (2013.01); *B25B 11/02* (2013.01); *B25B 27/0078* (2013.01); *B60B 21/02* (2013.01); *B60B 2320/30* (2013.01)

(58) Field of Classification Search
  CPC ..... B25B 27/0078; B25B 11/00; B25B 11/02; Y10T 29/53448; Y10T 29/53983; Y10T 29/53961; B60B 2320/30; F16F 15/32; F16F 15/324; B23Q 3/18; B23Q 3/183; B23Q 3/186; B23Q 1/42; B23Q 1/56; B23Q 1/58; B23Q 1/60

See application file for complete search history.

(56) References Cited

U.S. PATENT DOCUMENTS

| 6,539,852 | B2 * | 4/2003 | Ertl | G01M 1/326 |
| | | | | 100/211 |
| 7,237,326 | B2 * | 7/2007 | Boni | G01M 1/02 |
| | | | | 29/705 |
| 7,478,659 | B2 * | 1/2009 | Jeon | G01M 1/326 |
| | | | | 156/358 |
| 8,182,639 | B2 * | 5/2012 | Donnay | F16F 15/345 |
| | | | | 156/281 |
| 10,500,649 | B2 * | 12/2019 | Xue | B23B 41/00 |
| 2007/0221337 | A1 * | 9/2007 | Sammartin | B23Q 3/062 |
| | | | | 157/14 |

* cited by examiner

*Primary Examiner* — Tyrone V Hall, Jr.
(74) *Attorney, Agent, or Firm* — Cooper Legal Group, LLC

(57) ABSTRACT

A fixture for sticking balance blocks to the surface of a hub includes a base, in which a fixed plate is welded to one side of the upper end of the base, a slide rail butted to the fixed plate is connected to the other side of the base by bolts, a sliding block is connected to the slide rail in a sliding manner, the middle positions of the fixed plate and the sliding block are respectively connected with a first roller and a second roller of the same type by bearings, each of the first roller and the second roller is sleeved with a rubber sleeve of the same specification, and a support table is mounted under the base.

5 Claims, 2 Drawing Sheets

FIXTURE FOR STICKING BALANCE BLOCKS TO SURFACE OF HUB

CROSS-REFERENCE TO RELATED APPLICATIONS

The present application claims benefit of Chinese Application No. 201810505284.8, filed on May 24, 2018, the contents of which are hereby incorporated by reference in its entirety.

BACKGROUND

The balance block is also known as a tire balance block. It is a counterweight component mounted on a wheel of a vehicle. The function of the balance block is to keep the wheel in dynamic balance under high-speed rotation.

With the improvement of road conditions in China and the rapid development of automobile technology level, the running speed of vehicles is increasingly high. If the mass of automobile wheels is not uniform, not only is the ride comfort affected in the high-speed driving process, but also the abnormal wear of automobile tires and suspension systems is increased, and the difficulty in controlling the automobile during driving is increased, resulting in driving insecurity. In order to avoid this situation, the wheel must undergo dynamic balance test by a wheel dynamic balancer before installation. An appropriate counterweight is added to the light mass portion of wheel to keep the wheel in dynamic balance under high-speed rotation. This counterweight is a wheel balance block.

The existing balance block is a simple rectangular metal block. In specific use, the balance block is stuck to the surface of the hub, but its overall applicability is not strong, and the balance block is not arranged tightly, limited in shape, and not fold in place, so the balance block cannot fit with the surface of the hub well and has certain limitations.

SUMMARY

The present disclosure relates to the technical field of hubs, in particular to a fixture for sticking balance blocks to the surface of a hub.

The objective of the present disclosure is to provide a fixture for sticking balance blocks to the surface of a hub, where rollers are used for placing the hub to facilitate the sticking of the balance blocks to the surface of the hub, rubber sleeves are mounted on the rollers to protect the surface of the hub and prevent the surface of the hub from being scratched, a handle bolt is mounted on a side of a base to adjust the levelness of the base and maintain the surface of the hub horizontal; the rollers are synchronously rotated by the drive of a chain to adjust the positions of the balance blocks stuck to the surface of the hub.

In order to achieve the above objective, the present disclosure provides the following technical solution: a fixture for sticking balance blocks to the surface of a hub includes a base, in which a fixed plate is welded to one side of the base, a slide rail butted to the fixed plate is connected to the other side of the base by bolts, a sliding block is connected to the slide rail in a sliding manner, the fixed plate and the sliding block are respectively connected with a first roller and a second roller of the same type by bearings, each of the first roller and the second roller is sleeved with a rubber sleeve of the same specification, a support table is mounted below the base, fixed blocks corresponding to the support table are welded to the sides of the base, the support table is connected with a connecting block corresponding to the base, a corresponding sprocket is mounted at each of the connecting block and the ends of the first roller and the second roller, and the three groups of sprockets are driven by a chain.

In an embodiment, a handle bolt may be in threaded connection to the middle of each fixed block, and at least two corresponding groups of handle bolts and fixed blocks may be provided.

In an embodiment, a handle may be mounted at the other end of the first roller and located on the outer side of the base.

In an embodiment, a bolt rod may be connected to the upper end of the sliding block in a penetrating manner, and the slide rail may be provided with a positioning hole corresponding to the bolt rod.

In an embodiment, the bottom of the support table may be connected with the connecting block, and a spring may be arranged under the connecting block.

The rollers are added to place the hub so as to facilitate the sticking of the balance blocks to the surface of the hub, at the same time, the rubber sleeves are mounted on the rollers to protect the surface of the hub and prevent the surface of the hub from being scratched by burrs on the surfaces of the rollers, and the handle bolt is mounted on the side of the base to adjust the levelness of the base and maintain the surface of the hub horizontal. The lower end of the support table is connected to the connecting block by the spring to ensure the chain in a tensioned state, and at the same time, the handle is mounted on the roller to drive the chain to rotate such that the rollers rotate synchronously to adjust the positions of the balance blocks stuck to the surface of the hub.

Figure 1:
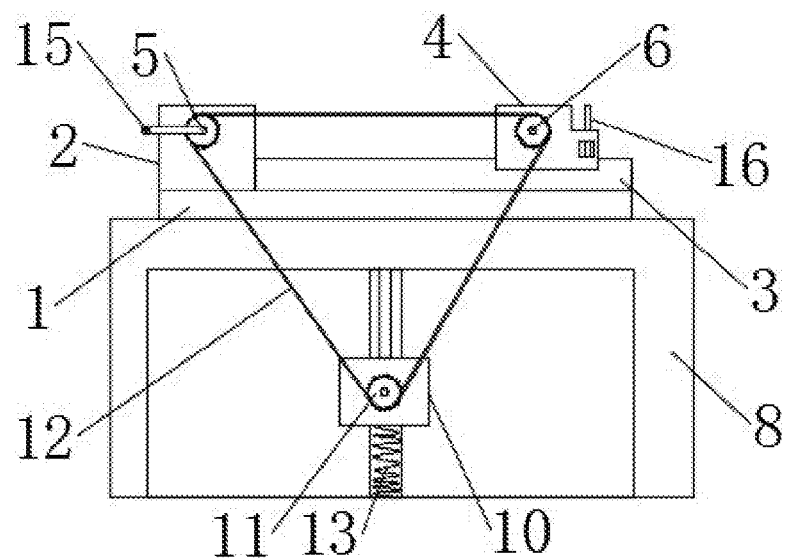
FIG. 1 is a structure diagram according to the present disclosure.

LIST OF REFERENCE SYMBOLS 1 base
2 fixed plate
3 slide rail
4 sliding block
5 first roller
6 second roller
7 rubber sleeve
8 support table
9 fixed block
10 connecting block
11 sprocket
12 chain
13 spring
14 handle bolt
15 handle
16 bolt rod
17 positioning hole

DETAILED DESCRIPTION

Figure 2:
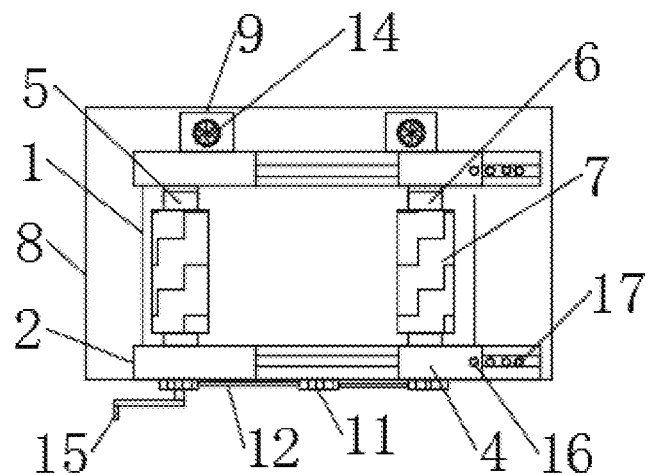
FIG. 2 is a top-view structure diagram according to the present disclosure.
Figure 3:
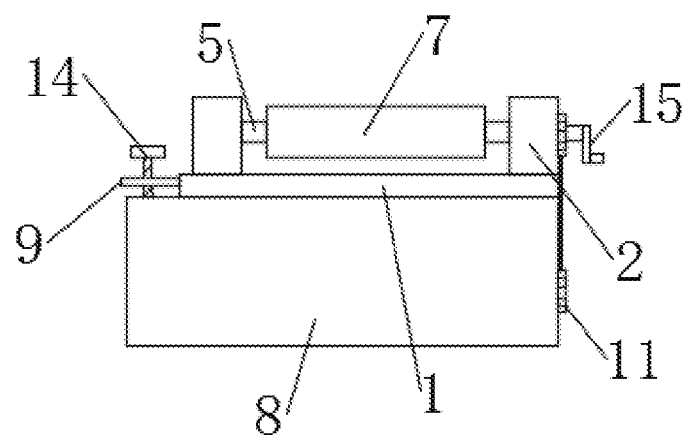
FIG. 3 is a side structure diagram according to the present disclosure.

Referring to FIGS. 1-3, the present disclosure provides a technical solution: a fixture for sticking balance blocks to the surface of a hub includes a base 1, in which a fixed plate 2 is welded to one side of the upper end of the base 1, a slide rail 3 butted to the fixed plate 2 is connected to the other side of the base 1 by bolts, a sliding block 4 is connected to the slide rail 3 in a sliding manner, the fixed plate 2 and the sliding block 4 are respectively connected with a first roller 5 and a second roller 6 of the same type by bearings, the sliding block 4 is in fit connection with the second roller 6 to adjust the spacing between the first roller 5 and the second roller 6 so as to adapt to hubs of different diameters, each of the first roller 5 and the second roller 6 is sleeved with a rubber sleeve 7 of the same specification, the rubber sleeves 7 are used for protecting the surface of the hub to prevent the surface of the hub from being scratched by burrs on the surfaces of the rollers, a support table 8 is mounted under the base 1, fixed blocks 9 corresponding to the support table 8 are welded to the sides of the base 1, the support table 8 is connected with a connecting block 10, a corresponding sprocket 11 is mounted at each of the connecting block 10 and the ends of the first roller 5 and the second roller 6, and the three groups of sprockets 11 are driven by a chain 12 to drive the surface of the hub to rotate so as to facilitate the sticking of the balance block.

Specifically, a handle bolt 14 is in threaded connection to the middle of each fixed block 9, at least two corresponding groups of handle bolts 14 and fixed blocks 9 are provided, the end surface of the base 1 is adjusted to balance via the handle bolts 14 mounted on the fixed blocks 9 to prevent the surface of the hub from toppling.

Specifically, a handle 15 is mounted at the other end of the first roller 5 and located on the outer side of the base 1, the handle 15 is used for driving the first roller 5 to rotate, and the chain 12 is driven to connect the second roller 6 via the sprockets 11 to maintain synchronous rotation of the first roller 5 and the second roller 6.

Specifically, a bolt rod 16 is connected to the upper end of the sliding block 4 in a penetrating manner, the slide rail 3 is provided with a positioning hole 17 corresponding to the bolt rod 16, and the bolt rod 16 fits with the positioning hole 17 in the slide rail 3 to fix the sliding block 4 so as to prevent the sliding block 4 from shaking when the balance block is stuck.

Specifically, the bottom of the support table 8 clamps a spring 18 under the connecting block 10 to ensure the chain 12 in a tensioned state.

Working principle: the sliding block 4 is moved during use, the spacing between the first roller 5 and the second roller 6 is adjusted to adapt to the hubs of different diameters, then the sliding block is fixed by the bolt rod 16, the sliding block 4 pulls the connecting block 10 via the chain 12 connected to the sprockets 11, the spring 13 mounted at the bottom of the support table 8 pulls the connecting block 10 such that the sprocket 11 mounted on the connecting block 10 is always clamped on the chain 12 to maintain the tensioned state of the chain 12 and ensure the drive reliability of the rollers, then the handle bolt 14 is rotated, the end surface of the base 1 is adjusted to be horizontal via the handle bolt 14 mounted on the fixed block 9 to maintain the hub in a horizontal state, the handle 15 is rotated after a balance block at the lower end of the hub is stuck, and the sprockets 11 fit with the drive of the chain 12 to maintain the synchronous rotation of the first roller 5 and the second roller 6 such that the hub rotates to stick a balance block on the other side, instead of rotation of the hub.

The invention claimed is:

1. A fixture for sticking balance blocks to a surface of a hub, comprising a base, wherein a fixed plate is welded to one side of the base, a slide rail butted to the fixed plate is connected to other side of the base by bolts, a sliding block is connected to the slide rail in a sliding manner, the fixed plate and the sliding block are connected with a first roller and a second roller of the same type by bearings, each of the first roller and the second roller is sleeved with a rubber sleeve of the same specification, a support table is mounted under the base, fixed blocks are welded to sides of the base, the support table is connected with a connecting block corresponding to the base, a corresponding sprocket is mounted at each of the connecting block and ends of the first roller and the second roller, and three groups of sprockets are driven by a chain.

2. The fixture for sticking balance blocks to a surface of a hub according to claim 1, wherein a handle bolt is in threaded connection to each fixed block, and at least two corresponding groups of handle bolts and fixed blocks are provided.

3. The fixture for sticking balance blocks to a surface of a hub according to claim 1, wherein a handle is mounted at one end of the first roller.

4. The fixture for sticking balance blocks to a surface of a hub according to claim 1, wherein a bolt rod is connected to an upper end of the sliding block in a penetrating manner, and the slide rail is provided with a positioning hole corresponding to the bolt rod.

5. The fixture for sticking balance blocks to a surface of a hub according to claim 1, wherein a bottom of the support table is connected with the connecting block, and a spring is arranged under the connecting block.

\* \* \* \* \*